United States Patent
Hermansen et al.

(10) Patent No.: US 7,635,170 B2
(45) Date of Patent: Dec. 22, 2009

(54) BICYCLE WHEEL

(75) Inventors: Frank Hermansen, Laguna Beach, CA (US); Carl Winefordner, Laguna Beach, CA (US)

(73) Assignee: Crank Brothers, Inc., Laguna Beach, CA (US)

( * ) Notice: Subject to any disclaimer, the term of this patent is extended or adjusted under 35 U.S.C. 154(b) by 0 days.

(21) Appl. No.: 11/546,209

(22) Filed: Oct. 11, 2006

(65) Prior Publication Data
US 2008/0088175 A1 Apr. 17, 2008

(51) Int. Cl.
*B60B 5/00* (2006.01)
*B60B 1/02* (2006.01)

(52) U.S. Cl. ............................. 301/104; 301/57; 301/59

(58) Field of Classification Search ................. 301/55, 301/57–60, 104; 29/894.33, 894.331–894.333
See application file for complete search history.

(56) References Cited

U.S. PATENT DOCUMENTS

| 337,223 A | * | 3/1886 | Williams | 301/57 |
| 338,484 A | * | 3/1886 | Clair | 301/60 |
| 339,661 A | * | 4/1886 | Zieger | 301/55 |
| 343,959 A | * | 6/1886 | Latta | 301/55 |
| 436,993 A | * | 9/1890 | Overman | 301/104 |
| 455,426 A | * | 7/1891 | Goodrich | 301/55 |
| 456,218 A | * | 7/1891 | Goodrich | 301/55 |
| 5,938,293 A | | 8/1999 | Dietrich | |
| 6,679,561 B2 | | 1/2004 | Addink | |
| 7,374,251 B2 | * | 5/2008 | Okajima et al. | 301/58 |
| 2003/0006643 A1 | * | 1/2003 | Chen | 301/104 |
| 2007/0145813 A1 | * | 6/2007 | D'Aluisio | 301/59 |

* cited by examiner

*Primary Examiner*—Jason R Bellinger
(74) *Attorney, Agent, or Firm*—Haynes and Boone, LLP.

(57) ABSTRACT

A spoked wheel comprises a rim, a hub, V-shaped spokes, nipples, and eyelets. There is true pairing of the spokes, because the rim has half the number of spoke attachments as there are nipples. True paired spoking means that there are no side wobble forces or rim twist caused by spoke tension. The rim has spoke attachment holes that are parallel to the axis of wheel rotation and are reinforced with eyelets. The rim has unnecessary material cut away between the spoke attachment holes. To ease adjustment, the nipples are located about midway between the hub and the rim. The hub has longitudinal ribs and that are aligned with each other. That allows the hub body to be machined from a relatively lightweight extrusion. To increase the wheel strength, the inboard spokes are moved outboard as much as possible. The hub has pairs of nipple attachment holes where each pair is located on a diagonal relative to the axis of the hub.

15 Claims, 9 Drawing Sheets

BICYCLE WHEEL

BACKGROUND OF THE INVENTION

1. Field of the Invention

The present invention relates generally to the field of bicycles and spoked wheels and more particularly to an improved spoked wheel suited for bicycles, wheelchairs, and motorcycles.

2. Background Art

A number of wheel designs have been made commercially available. The art of tensioned spoked wheels is one which dates back more than 100 years. Modern tensioned spoked bicycle wheels typically have between about 12 and 48 spokes. Generally, wheels with fewer spokes weigh less, but not always. At some point, as fewer spokes are used, the rims must become stronger because longer spans are unsupported, and thus the rim becomes heavier. The lightest possible rim results from a balance between the spoke number and design, the hub design, and the rim design.

Spoked wheels typically have a hub with two annular flanges, spokes, nipples, and a toroidal rim with a circumferential surface. The spokes attach at one end to the hub's annular flanges and at the other end to the circumferential rim surface via nipples. Some spokes have a "J" shape for hook attachment to the hub flange, and other spokes are essentially straight, with a head at one end and a thread at the other. In all cases, the spokes are substantially straight with the possible exception of the ends.

For bicycle front wheels that use rim brakes, the spokes can be radially laced, that is the spokes connect to the hub flanges in a path that would pass through the centerline of the hub. For bicycle or motorcycle front wheels with disc or drum brakes, at least some of the spokes attach tangentially to the hub flanges in order to better transfer the braking forces from the hub to the rim. Rear wheels that use rim brakes require at least some tangential spokes in order to transfer the torque of the rider or engine to the rim. Rear wheels that use disc or drum brakes also require tangential spokes. In the case of bicycles, the braking torque is higher than the drive torque of a person's legs, so the tangential spokes are even more important.

Traditionally, tensioned spokes from one hub flange alternately attach to the rim with the other hub flange, and at even spacing. Some newer tension spoked wheels have "paired spokes" wherein the spokes from one hub flange attach to the rim in proximity to spokes from the opposed hub flange. U.S. Pat. No. 5,938,293 (Dietrich) discloses a bicycle wheel with paired spokes attached closely together at the rim. Similarly, U.S. Pat. No. 6,679,561 (Addink et al.) discloses a bicycle wheel with paired spokes attached in proximity to the rim.

The advantage of traditional tensioned spoked wheels compared to paired spoke wheels is that for a given number of spokes, the unsupported spans of the rim are about twice as long for a paired spoke wheel. For example, for a 24 spoke wheel, the spokes will connect to 24 points evenly along a traditional spoked wheel rim, whereas for a paired spoke wheel, 24 spokes would attach to only 12 close regions along a pair spoked wheel rim, leaving longer unsupported sections of the rim. Note that even with paired spokes, the spokes always have some distance between their connecting points on the rim. The advantage of the paired spoke wheel is that the rim sees far lower loads that cause side wobble. So traditional spoked wheels induce lower hop forces and higher side wobble forces compared to pair spoked wheels.

U.S. Pat. No. 5,938,293, Dietrich discloses a paired spoke wheel wherein the spokes are paired along the same radial position, and apart from each other transversely. This type of pairing produces a twisting load on the rims because of the distance between the spoke connections. The spokes cannot be placed any closer together because of nipple access and wall material availability in the rim.

The spokes of prior art wheels attach to the circumferential rim surface via nipples or, in the case of some straight pull spokes, a flanged spoke end. There is a high concentration load at each point of spoke attachment. Rims are often made by an extrusion process, thus having a consistent rim floor thickness along this attachment surface. In order to make this rim attachment wall strong enough for the spokes, the wall is inherently stronger than necessary in the areas away from the spoke attachment points. In some wheels, spacers or eyelets are used to reinforce the attachment points, but the loads are still relatively concentrated. U.S. Pat. No. 6,402,256 (Mercat) discloses a traditional bicycle rim, wherein the otherwise consistent inner rim floor has been partially machined away between the points of spoke attachment. Note that this is a circumferentially oriented wall and not a radially oriented wall.

Spoked wheels that attach to the hub via the nipples are difficult to adjust because access to the nipples is limited. Oftentimes, the spoke wrench can only turn the nipples 45 degrees of a turn before the wrench needs to be removed and placed on the nipple again. This is an extremely cumbersome way to adjust the spoke tension. Paired spoke wheels with nipples attached at the rim can have this same problem of cumbersome spoke tension adjustment because the close proximity of the spoke connections interferes with rotating the spoke wrench a full turn during adjustment. Regardless of the wheel type, all spoke nipples are relatively short compared to the length of the spoke.

Traditionally, spoked wheels require inner tubes because otherwise, holes in the rim for the spokes would cause air leakage. Typically, the rim has two flanges for holding the bead of the tire, a circumferential wall to hold the flanges, and another circumferential wall forming the inner rim floor for spoke attachment. Typically, the spoke holes are machined through both circumferential walls in order to be able to insert the nipples. Some newer tubeless spoked wheel designs for bicycles have holes in the rim that are machined only through the rim floor for spoke attachment so that air cannot leak out of a tubeless tire. This also strengthens the rim, although manufacturing the rim is more difficult.

If a spoke breaks, the wheel will suddenly become out of true because of the imbalance in tensions. If a spoke breaks during a ride and is not replaced immediately, the wheel may need to be trued before riding continues in order to prevent the rim from rubbing on the brakes or frame. If the rider adjusts the spoke tensions to compensate for the broken spoke, then the wheel needs to be trued again after the spoke is replaced. Therefore, some riders carry a spare spoke to replace a broken spoke while in the middle of a ride. Replacing the spoke on the front wheel or the non-drive side of the rear wheel is oftentimes faster than not replacing the spoke and then adjusting the other spokes to compensate for the broken spoke. Additionally, this relieves stress on the wheel by balancing the tensile loads according to the original design. However, it is typically difficult or impossible to replace a drive side rear spoke with current hub designs without using special tools.

Prior art hubs are usually machined from bar stock of material with an outer diameter about the same size as the maximum flange or rib diameter of the hub. A tremendous amount of aluminum is wasted during this process.

Prior art wheels have inboard and outboard spokes. For wheels with ribs for spoke attachment wherein there are two spokes per rib, the mounting points are next to one another and equidistant from the centerline of the hub. This causes the inboard spokes to be more substantially inboard from the outboard spokes, weakening the wheel.

SUMMARY OF THE INVENTION

The present invention comprises a tension spoke wheel with long nipples and wishbone spokes attached to a radial rim flange and is especially suited for bicycles and the like. This wheel allows easy spoke tension adjustment because the long nipples, which attach at the hub, allow easy access for a spoke wrench to revolve without interference. Furthermore, the orientation of the radial rim flange allows the wishbone spokes to attach in true-paired fashion, eliminating side-wobble forces. Also, the radial rim flange can be easily machined to more efficiently use the rim material, so that the unsupported spans of the rim are structurally efficient. Attaching the spokes to the rim in this way allows the rim to be stronger at the same weight, or lighter at the same strength.

When the rim is made of aluminum or magnesium, the rim is first extruded, then bent, and then joined. The rim flange is machined to remove material that is not necessary for supporting the loads, thereby providing just sufficient material for attachment of the spokes, and just sufficient material for support of the rim between spoke attachments. Spoke holes are drilled in the rim parallel to the axis of the rotation of the wheel and eyelets are installed in each spoke hole to strengthen the holes and more evenly distribute the spoke loads into the rim flange.

The spokes are made from a length of wire with a thread at each end and then bent in the middle into a wishbone or V shape. Each spoke of the preferred embodiment takes the place of two conventional spokes. For a 24 nipple wheel, there are only 12 spokes, 24 nipples, 12 rim spoke holes, and 12 eyelets. Each spoke passes through an eyelet in a spoke hole so that the mid-point or apex of the spoke resides in the spoke hole. Each nipple passes through a hub hole and is threaded onto an end or leg of a spoke. In this way, the wheel has trued paired spoking in that for a 24 nipple wheel, there are only 12 points of attachment to the rim.

Another advantage of this system is that no holes are required to be drilled through the floor of the rim. This strengthens the rim and prevents sharp edges from contacting the inner tube. Also, this is more suitable for using tubeless tires, if desired.

The hub has longitudinal ribs protruding from the center of the hub. Each rib has two attachment holes for spoke nipples to pass through in opposite directions. The attachment holes are oriented diagonally relative to the hub axis so that the inboard spokes will be as outboard as possible, making the wheel stronger.

Another advantage results from that the wheel having true spoke pairing, is that the ribs of the hub are exactly in line with one another. This means that there will be far less material wasted in manufacturing. For manufacturing, the hub can be extruded with the ribs standing and then very little material is machined away compared to typical hubs which must be machined from a large round bar of material. Also, there is significantly less machining time required compared to the prior art.

Another advantage is that because the wheel has true spoke pairing, the wheels are less susceptible to "tacoing". A wheel is said to "Taco" when a side impact distorts the wheel into the shape of a taco.

The hub has longitudinal ribs for spoke attachment wherein there are two spokes mounted per rib. The mounting points are drilled diagonally next to one another wherein they have different distances from the centerline of the hub. This allows the inboard spokes to be further outboard, thereby strengthening the wheel.

Accordingly, it is an object of the invention to provide a tensioned spoked wheel with a spoke and rim configuration which eliminates or reduces internal, unresolved lateral spoke force vectors in the rims associated with prior art wheels.

It is still another feature of the present invention to provide a spoked bicycle wheel in which the net force of all of the spokes lies in the rotational plane of the wheel.

It is a further object of the present invention to provide a tensioned spoked wheel that has a rim that uses material more efficiently to produce a stronger wheel for a given weight.

It is a further object of the present invention to provide a tensioned spoked wheel that wastes less material in manufacturing the hub.

It is a further object of the present invention to provide a tensioned spoked wheel that has a hub with paired longitudinal flanges that are in line with one another.

It is a further object of the present invention to provide a tensioned spoked wheel that has true paired spoking, wherein there are half the number of spoke attachments to the rim compared to prior art wheels.

It is a further object of the present invention to provide a tensioned spoked wheel that has easy spoke tension adjustment access.

It is a further object of the present invention to provide a tensioned spoked wheel, which has a hub with holes for attachment to the nipples.

It is a further object of the present invention to provide a tensioned spoked wheel, which has wishbone shaped spokes that connect to the rim between the spoke ends.

It is a further object of the present invention to provide a tensioned spoked wheel, which has nipple members that are longer than 50 mm.

It is a further object of the present invention to provide a tensioned spoked wheel, which has spoke nipple adjustment located about midway between the rim and the hub.

It is a further object of the present invention to provide a tensioned spoked wheel, which has a rim with only half the number holes for spokes as there are nipples.

It is a further object of the present invention to provide a tensioned spoked wheel, which has a hub with diagonally positioned nipple mounting holes.

It is a further object of the present invention to provide a tensioned spoked wheel, which has true paired spoking.

It is a further object of the present invention to provide a tensioned spoked wheel, which is lighter at the same strength or is stronger at the same weight compared to conventional wheels.

It is a further object of the present invention to provide a tensioned spoked wheel, which has a rim with holes for receiving the spokes, the holes having an axis that is parallel to the axis of wheel rotation.

These and other objects and advantages of the present invention will no doubt become apparent to those skilled in the art after having read this detailed description of the invention including the following description of the preferred embodiment, which is illustrated by the various drawing figures.

BRIEF DESCRIPTION OF THE DRAWINGS

The aforementioned objects and advantages of the present invention, as well as additional objects and advantages thereof will be more fully understood hereinafter, as a result of a detailed description of preferred embodiments thereof, when taken in conjunction with the following drawings in which.

REFERENCE NUMERALS IN DRAWINGS

| 10 | bicycle wheel | 30 | rim |
|---|---|---|---|
| 32 | hole | 34 | lip |
| 36 | lip | 38 | wall |
| 40 | wall | 42 | wall |
| 44 | wall | 50 | hub |
| 52 | longitudinal rib | 54 | outboard hole |
| 56 | spherical surface | 58 | inboard hole |
| 60 | spherical surface | 62 | hole |
| 64 | longitudinal rib | 68 | hole |
| 72 | body | 80 | spoke |
| 82 | bend | 84 | thread |
| 86 | shaft | 100 | nipple |
| 102 | adjustment means | 104 | head |
| 106 | shaft | 108 | thread |
| 110 | spherical surface | 112 | threaded end |
| 120 | bearing | 130 | seal |
| 140 | axle | 150 | end cap |
| 160 | eyelet | 162 | bend |
| 164 | hole | 166 | bend |
| 170 | extrusion | 172 | outside diameter |
| 174 | inside diameter | 180 | extrusion |
| 182 | longitudinal rib | 184 | inside diameter |
| 200 | wheel | 210 | wheel |
| 220 | wheel | 230 | wheel |
| 240 | spoke | 250 | rim |
| 260 | hub | 270 | rim |
| 272 | area | 280 | hub |
| 290 | rim | 300 | hub |

-continued

REFERENCE NUMERALS IN DRAWINGS

| 310 | rim | 320 | prior art hub body |
|---|---|---|---|
| 322 | flange | 324 | flange |

DETAILED DESCRIPTION OF PREFERRED EMBODIMENT

Referring to the accompanying drawings and first to FIGS. 1 to 13, it will be seen that the foregoing and other objects are attained, according to the present invention by a wheel 10, which comprises of a rim 30, a hub 50, wishbone or V-shaped spokes 80, nipples 100, and eyelets 160. It can be seen that there is a true pairing of the spokes, because the rim 30 has half the number of spoke attachments as there are nipples. True paired spoking means that there are no side wobble forces or rim twist caused by spoke tension. The rim 30 has spoke attachment holes 32 that are parallel to the axis of wheel rotation and are reinforced with eyelets 160. Rim 30 has unnecessary material cut away between the spoke attachment holes 32. To ease tension adjustment, the nipples 100 are placed so that spoke tension adjustment means 102 is located about midway between the hub 50 and the rim 30. As used herein, the term "midway" means more than 20% and less than 80% of the distance between the hub and the rim and preferably more than 40% and less than 60% of that distance.

Figure 14:
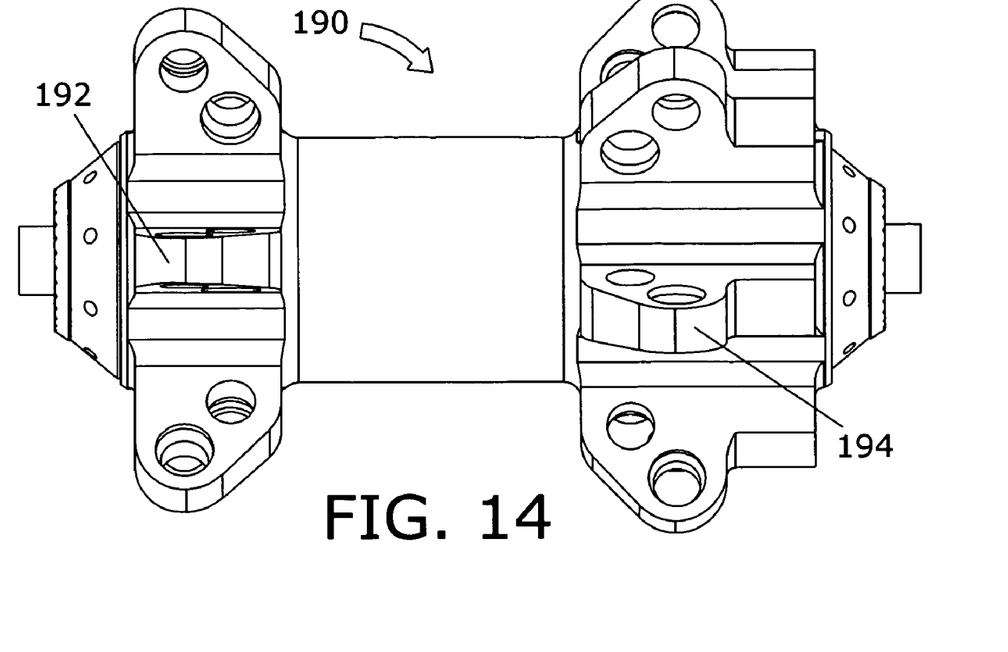
FIG. 14 is a side view of the hub assembly of an alternative embodiment bicycle wheel shown in FIG. 16.
Figure 15:
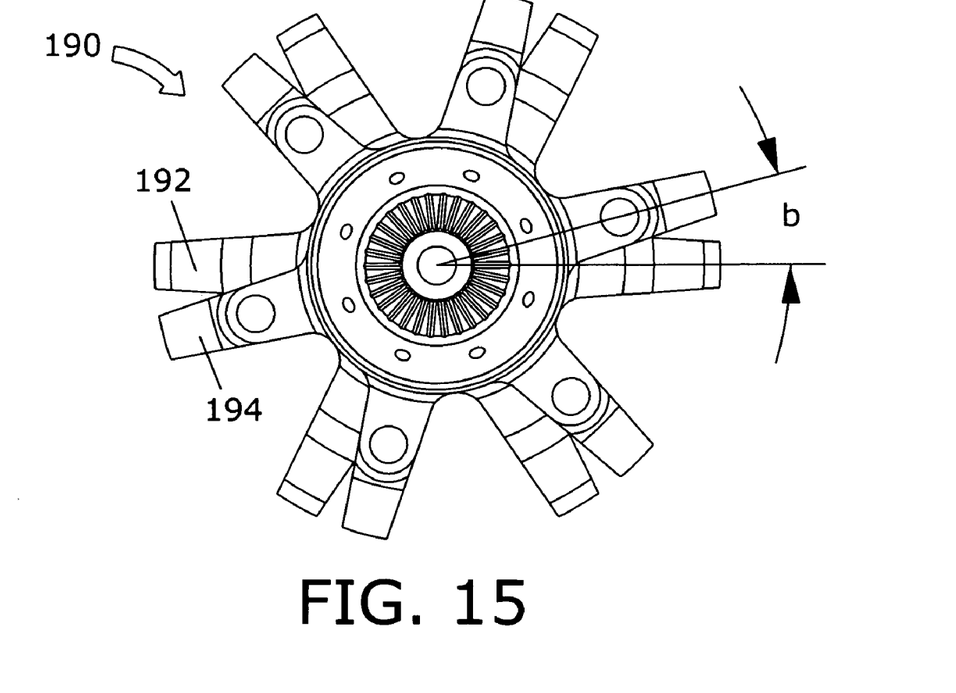
FIG. 15 is an end view of the hub assembly of shown in FIG. 14.

Manufacturing hub 50 wastes little material because hub 50 has longitudinal ribs 52 and 64 that are aligned with each other. That allows the hub body 72 to be machined from a relatively lightweight extrusion 180. To increase the wheel strength, the inboard spokes are moved outboard as much as possible because hub 50 has nipple attachment holes 54 and 58 that are located diagonally relative to the axis of the hub. In FIGS. 14 and 15, a hub for an alternative embodiment wheel is shown. In FIGS. 16-19, four alternative embodiment wheels are shown. This system has a number of advantages over the prior art.

Figure 1:
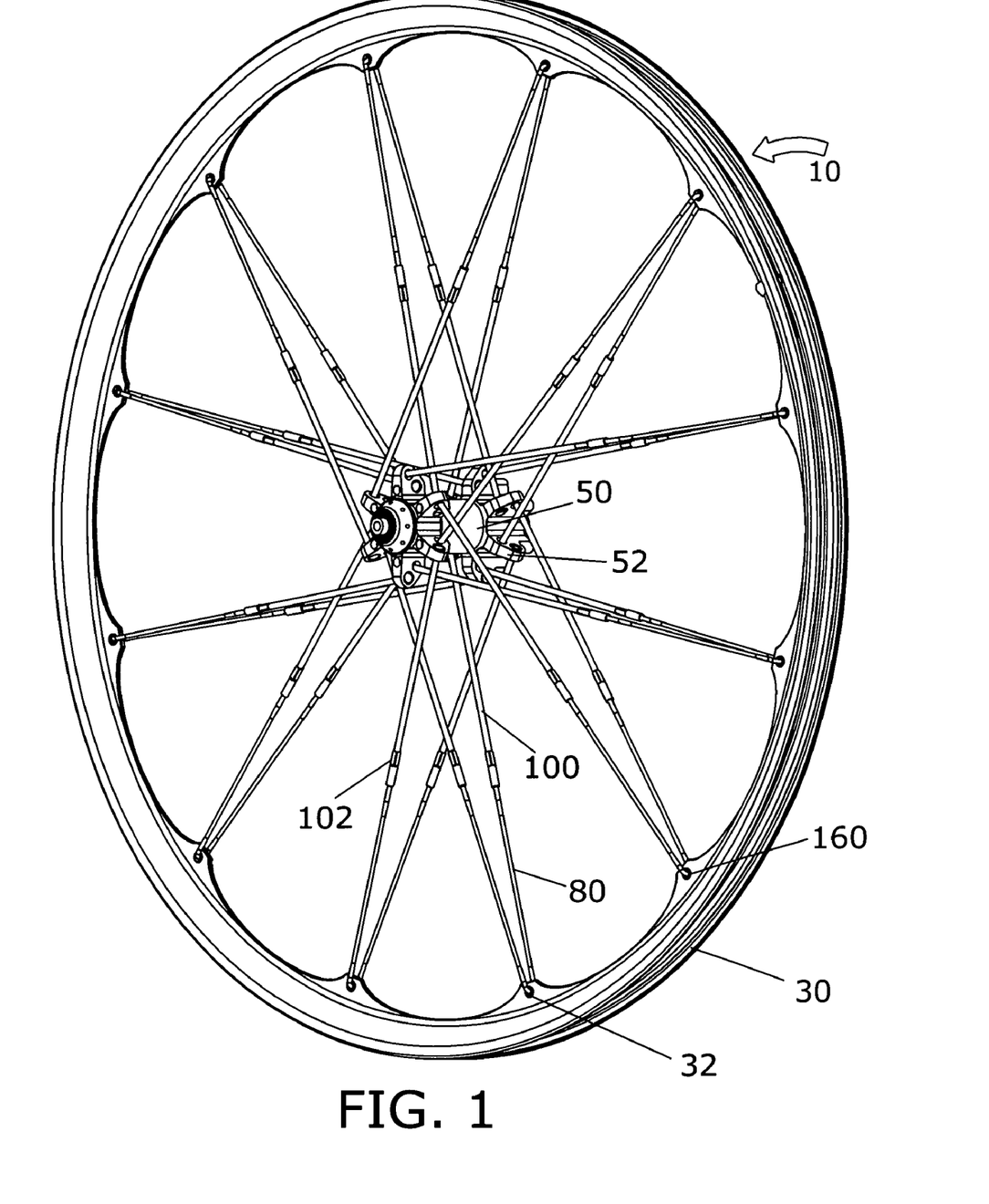
FIG. 1 is a perspective view of a bicycle wheel assembly in accordance with the preferred embodiment.
Figure 2:
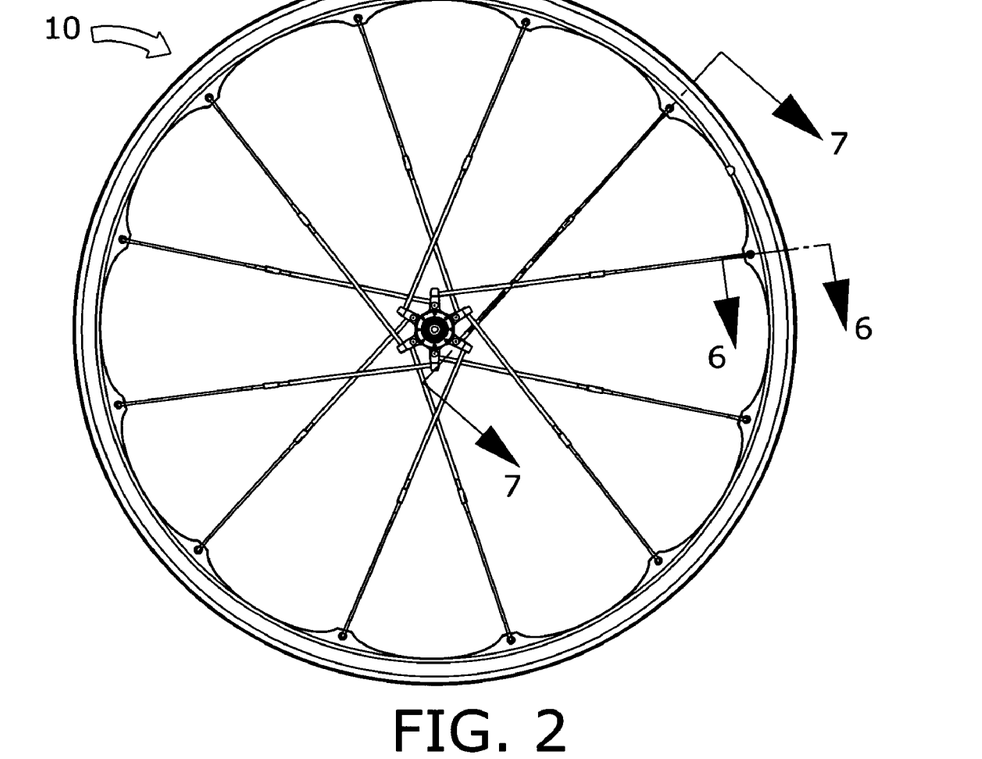
FIG. 2 is a plan view of the bicycle wheel assembly in accordance with the preferred embodiment.

FIG. 1 shows a bicycle wheel assembly 10, which comprises a rim 30, a hub 50, wishbone or V-shaped spokes 80, nipples 100, and eyelets 160. This particular wheel 10 is configured for use with a disc brake rotor. The wheel has a crossing spoke pattern because when using a disc brake rotor, braking forces are transferred through the hub 50, through the nipples 100 and spokes 80, into the rim 30, and into the tire. It can be seen that there is true pairing of the spokes, because the rim 30 has half the number of attachments 32 as there are nipples 100. True paired spoking means that there are no side wobble forces or rim twist caused by spoke tension. The rim 30 has spoke attachment holes 32 that have axes that are parallel to the axis of wheel rotation and are reinforced with eyelets 160 as shown best in FIG. 6. Rim 30 has unnecessary material cut away between the spoke attachment holes 32. To ease adjustment, the nipples 100 are so that spoke tension adjustment means 102 is located about midway between the hub 50 and the rim 30. While this wheel may appear to have 24 spokes, it actually has 24 nipples and only 12 wishbone or V spokes each having two legs. Spokes 80 are connected to the rim 30 substantially in the middle or apex of spoke 80 between the spoke legs or ends. Rotational inertia is reduced by the weight of the spoke to nipple connection being moved away from rim 30 towards hub 50.

Figure 3:
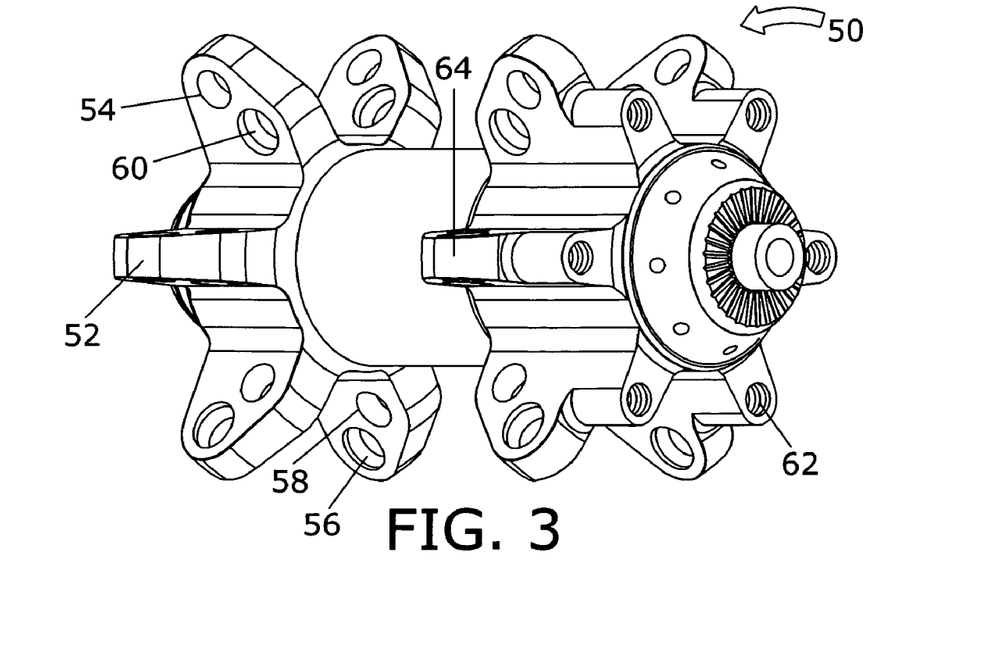
FIG. 3 is a perspective view of the hub assembly of the novel bicycle wheel shown in FIG. 2.
Figure 4:
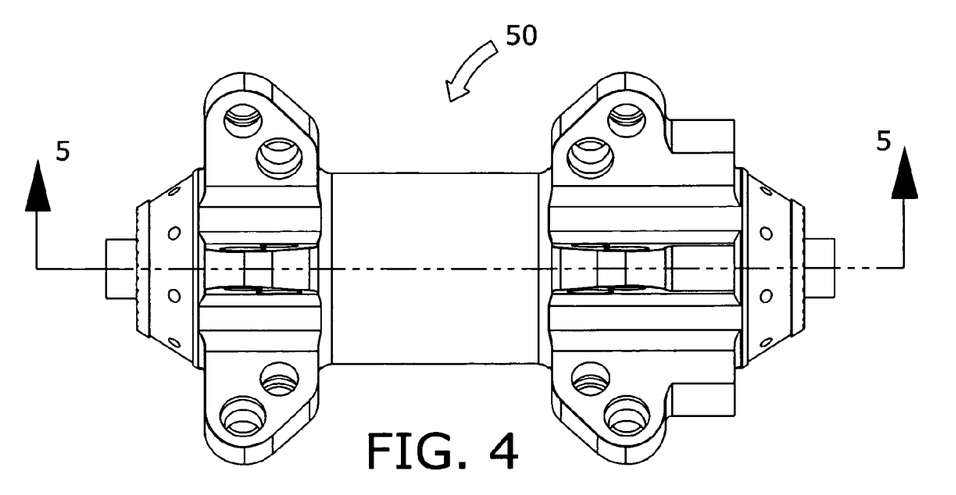
FIG. 4 is a side view of the hub assembly shown in FIG. 3.

FIG. 3 shows the hub assembly 50 of the novel bicycle wheel 10. The hub 50 has six longitudinal ribs 52 on one side aligned with six longitudinal ribs 64 on the other side equally spaced. For nipple attachments, outboard hole 54 has a spherical surface 56, and inboard hole 58 has a spherical surface 60. There are six threaded holes 62 for mounting a disc brake rotor (not shown).

Figure 5:
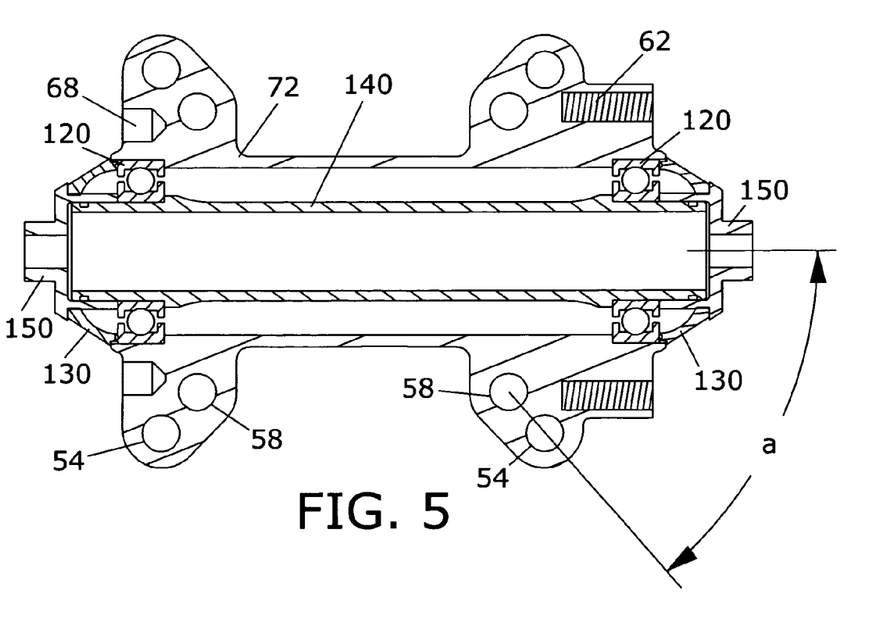
FIG. 5 is a cross sectional view of the hub assembly shown in FIG. 4.

FIG. 5 shows that hub assembly 50 comprises a body 72, an axle 140, two cartridge bearings 120, two seals 130, and two end caps 150. Inboard holes 58 and outboard holes 54 are positioned at an angle "a" so that the inboard spokes are as far outboard as possible without interfering with the outboard spokes. The farther outboard the spokes are, the stronger is the wheel. Threaded holes 62 are for mounting a disc brake rotor. Holes 68 lighten the hub by removing unnecessary material. Prior art hubs have longitudinal ribs that are not aligned with each other, and an angle of "a" that is at or near zero.

Figure 6:
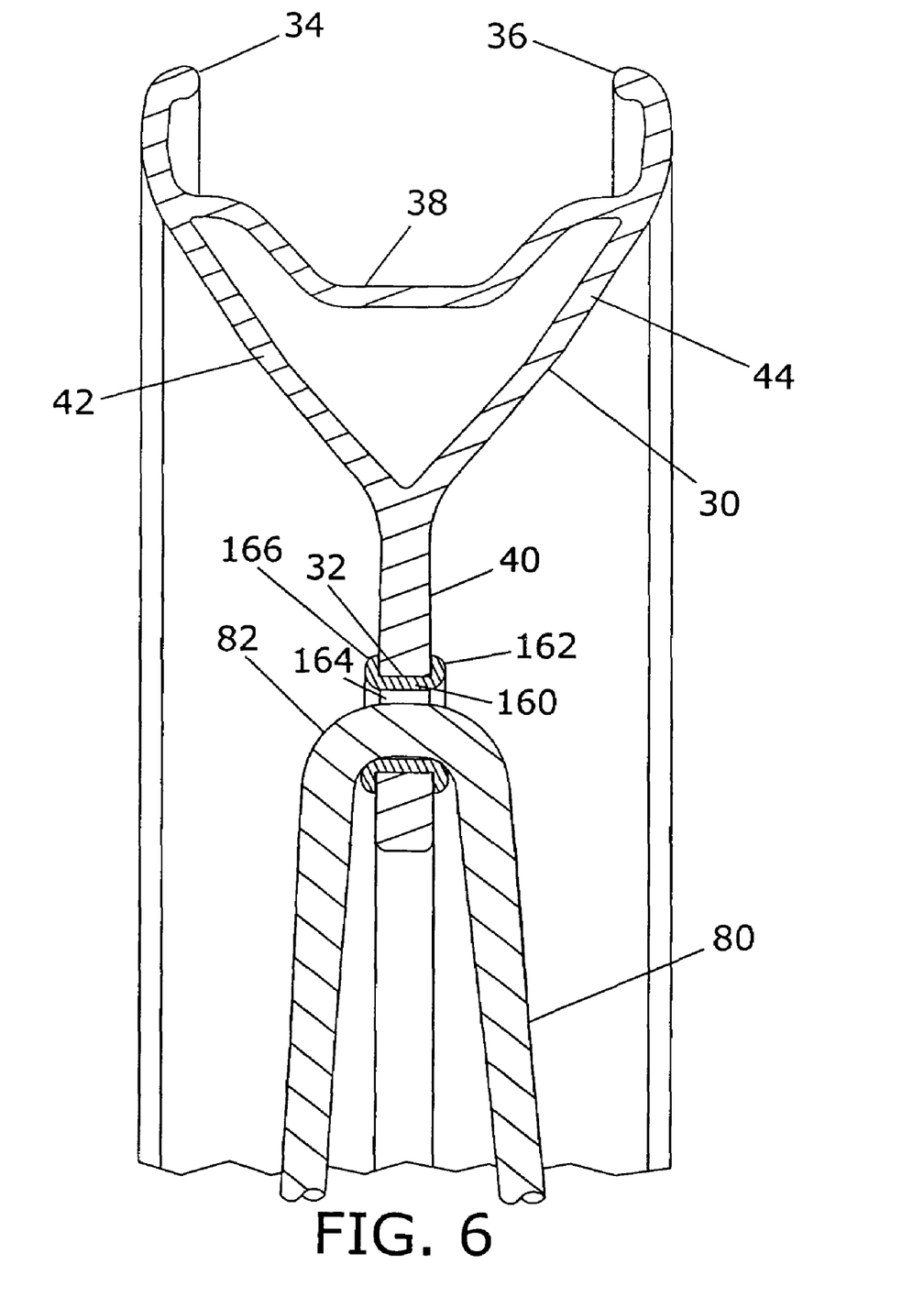
FIG. 6 is a partial cross sectional view of the wheel assembly shown in FIG. 2, taken along lines 6-6.

FIG. 6 shows the rim 30 with an eyelet 160 riveted through hole 32 of vertical wall 40. Bends 162 and 166 secure eyelet 160 to rim 30. Eyelet hole 164 allows spoke 80 to pass through eyelet 160. Spoke 80 has a bend 82 that generally conforms to eyelet 160. Rim 30 has lips 34 and 36 to secure a clincher type tire bead, and circumferential wall 38, as is well known in the prior art. Walls 42 and 44 connect to a vertical wall 40.

Figures 7, 8, 9:
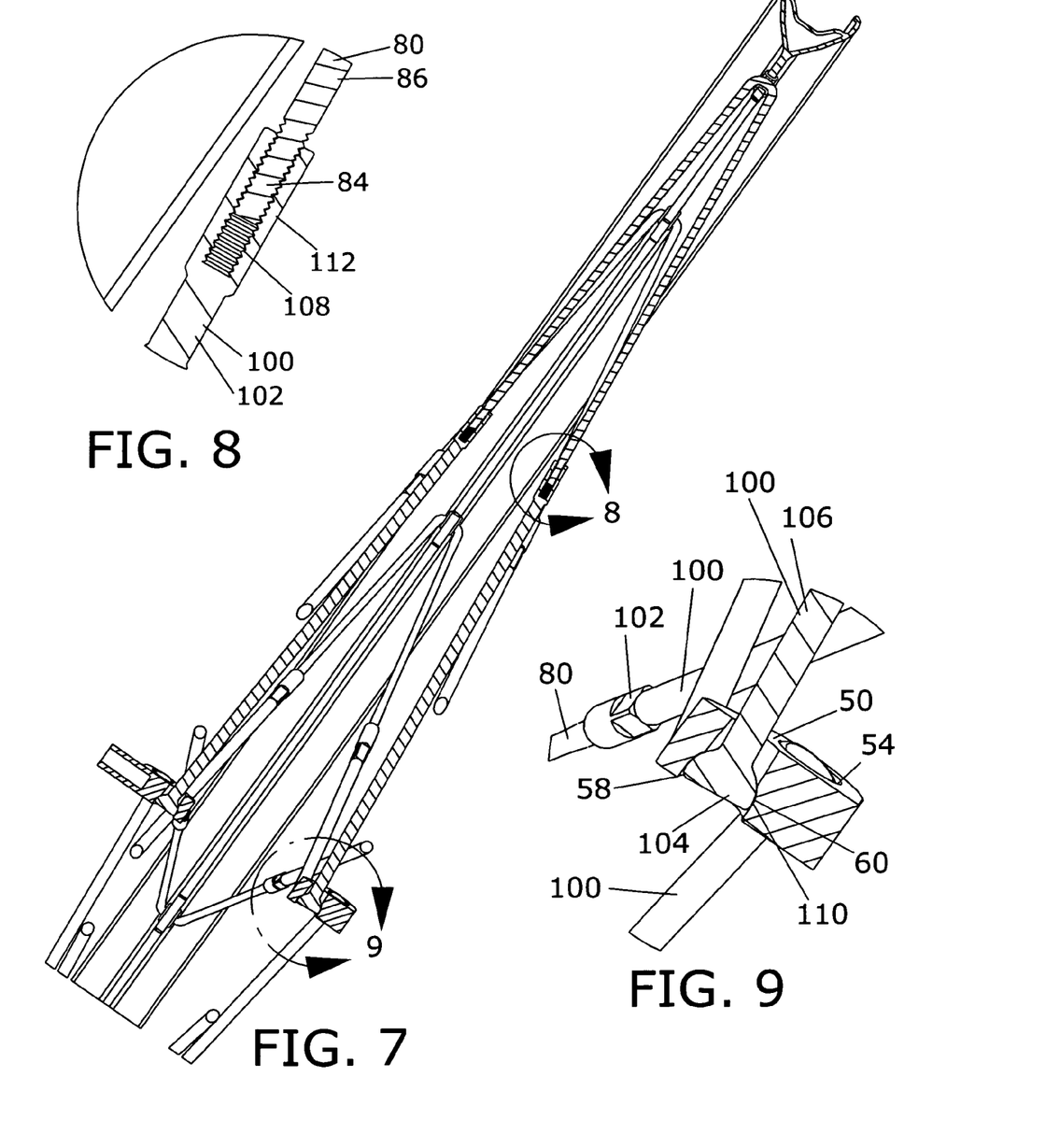
FIG. 7 is another partial cross sectional view of the wheel assembly shown in FIG. 2 and taken along lines 7-7.
FIG. 8 is detail view of the encircle area 8 shown in FIG. 7.
FIG. 9 is another detail view of the encircled area 9 shown in FIG. 7.

FIG. 8 shows spoke 80 assembled to nipple 100. Spoke 80 has a shaft 86 with a thread 84 that is screwed into thread 108 of threaded end 112 of nipple 100. Nipple 100 has wrench flat adjustment portion 102 for adjusting spoke tension. There is easy access for a spoke wrench to adjust spoke tension.

FIG. 9 shows one nipple 100 connected to hub 50 through hole inboard hole 58. Nipple head 104 is prevented from pulling through hub 50 by spherical surface 110 of nipple 100 mating to spherical surface 60 of hub 50. Spherical surfaces 110 and 60 allow nipple 100 to have more complete contact with hub 50 regardless of small angle changes of the nipple relative to the hub 50. Another nipple 100 is connected to hub 50 through hole 54. Adjustment portion 102 facilitates wrench attachment to adjust tension with spoke 80.

Figure 10:
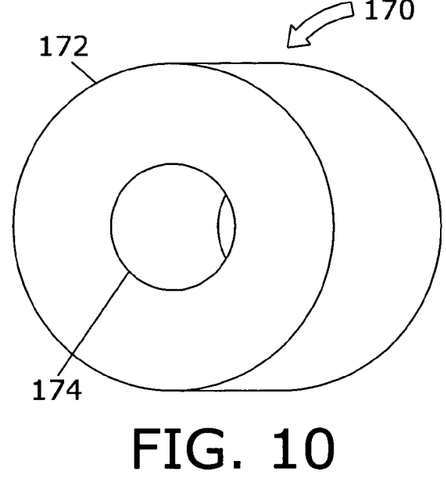
FIG. 10 is a perspective view of the extrusion used to make a prior art hub body.

FIG. 10 shows an example of a short length of extrusion 170 with an outer diameter 172 of 66 mm and an inner diameter 174 of 25.5 mm used for machining a prior art hub body. An aluminum 82 mm length of extrusion 170 would weigh about 644 grams.

Figure 11:
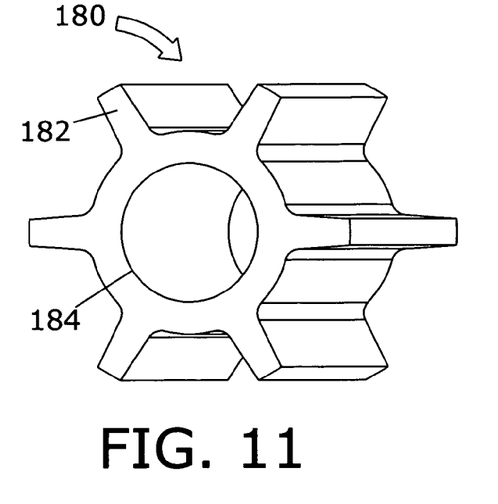
FIG. 11 is a perspective view of the extrusion used to make the hub body of the hub assembly shown in FIG. 3.

FIG. 11 shows an example of a short length of extrusion 180 with longitudinal ribs 182 and an inner diameter 184 of 25.5 mm used for machining the novel hub body of the preferred embodiment. An aluminum 82 mm length of extrusion 180 would weigh only about 263 grams.

Figure 12:
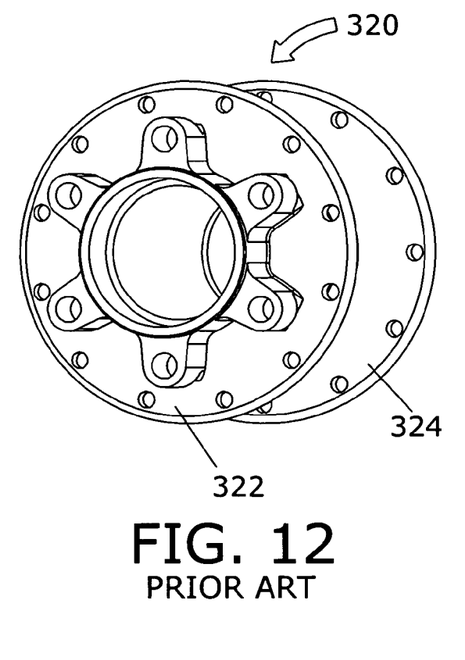
FIG. 12 is a perspective view of a prior art hub body.

FIG. 12 shows an example of a prior art hub body 320 with spoke flanges 322 and 324. This particular hub body weighs 88 grams. In order to machine this hub body 320 from aluminum, 556 grams of aluminum is wasted. There is also significant machining time required.

Figure 13:
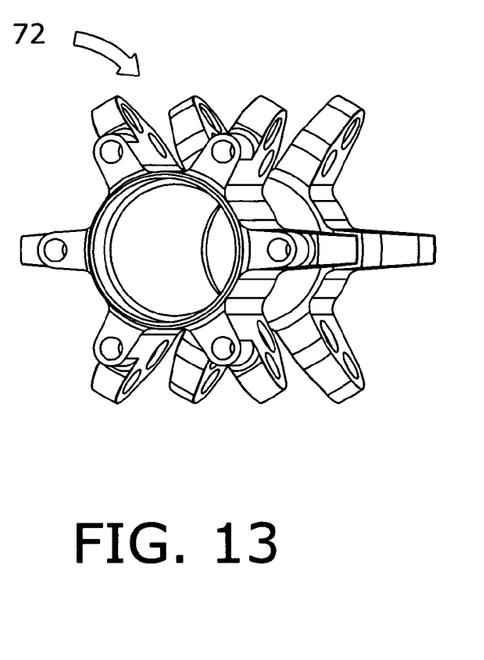
FIG. 13 is a perspective view of the hub body of the hub assembly shown in FIG. 3.

FIG. 13 shows hub body 72. This particular hub body weighs 88 grams in aluminum. In order to machine this hub body 72 from aluminum, 175 grams of aluminum is wasted. That is 381 grams less wasted aluminum compared to the prior art. There is also significantly less machining time required.

FIG. 14 shows an alternative embodiment hub 190 designed to be used with nipples 100 and a conventional rim 250. Longitudinal ribs 192 and 194 are not aligned.

FIG. 15 shows that longitudinal ribs 192 and 194 are an angle "b" apart to accommodate the spoke pattern of a conventional rim 250. This particular hub 190 is designed for a 24 spoke wheel, but with a different quantity of longitudinal ribs, could be designed for various quantities of spokes.

Figures 16, 17:
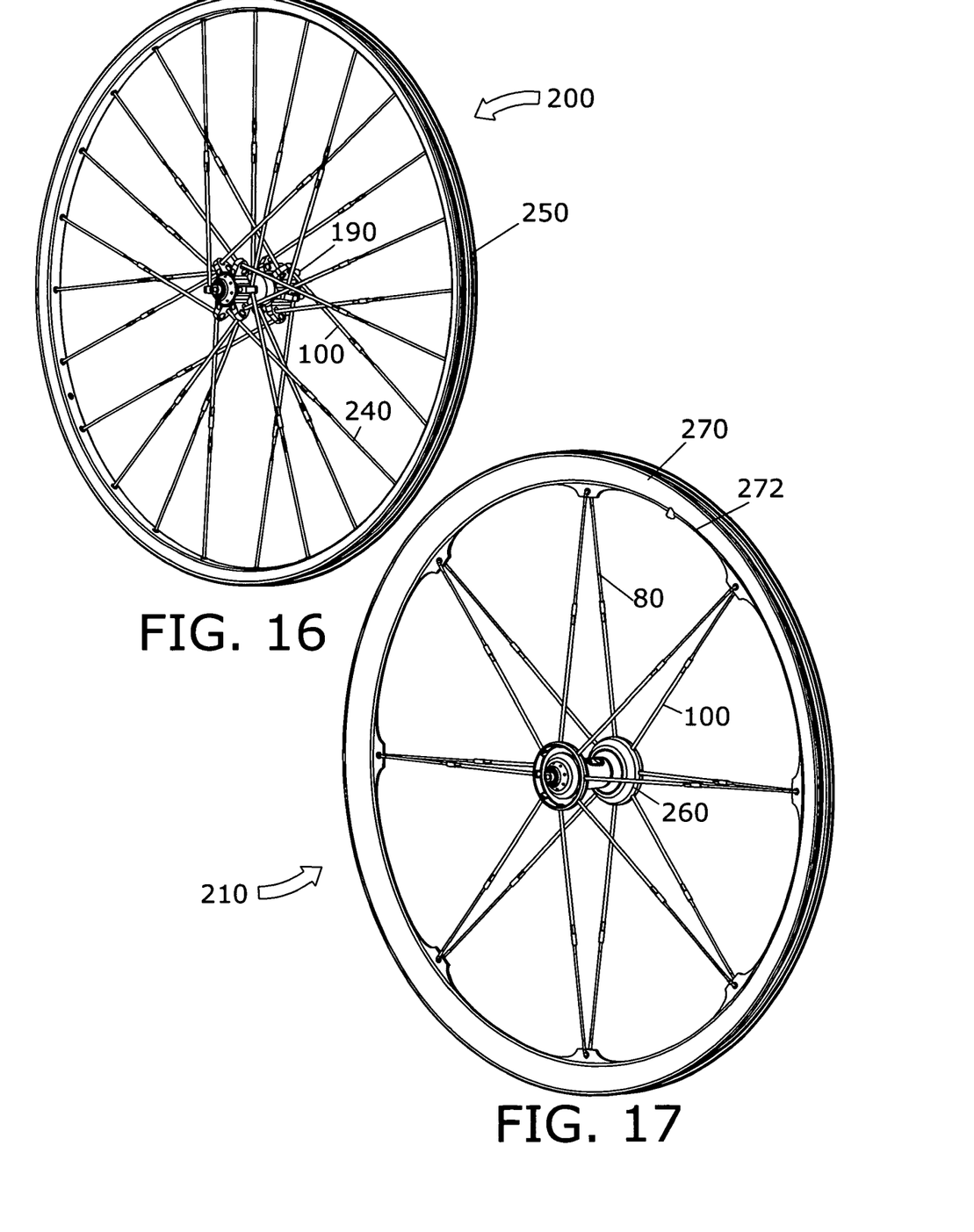
FIG. 16 is a perspective view of a first alternative embodiment of the inventive bicycle wheel.
FIG. 17 is a perspective view of a second alternative embodiment of the inventive bicycle wheel.

FIG. 16 shows an alternative embodiment wheel 200 comprised of a hub 190, nipples 100, spokes 240, and a conventional rim 250. While wheel 200 does not have true paired spoking, many advantages remain compared to the prior art. Easy access spoke tension adjustment is still made via adjustment portions 102 about midway between hub 190 and rim 250. The inboard spokes are farther outboard than prior art wheels because of the angled hole locations of hub 190 (similar to hub 50). Rotational inertia is reduced by the weight of the spoke to nipple connection being moved away from rim 250 towards hub 190.

FIG. 17 shows an alternative embodiment wheel 210 comprises of a hub 260, nipples 100, wishbone or V spokes 80, and a rim 270. Wheel 210 has true paired spoking with radial lacing. That is, the axis of spokes 80 pass through the centerline of hub 260. Wheel 210 would be used as a front wheel of a bicycle using rim brakes. Easy access spoke tension adjustment is still made via adjustment portions 102 about midway between hub 260 and rim 270. Rotational inertia is reduced by the weight of the spoke to nipple connection being moved away from rim 270 towards hub 260. Unnecessary material has been machined away from rim 270 along areas 272.

Figures 18, 19:
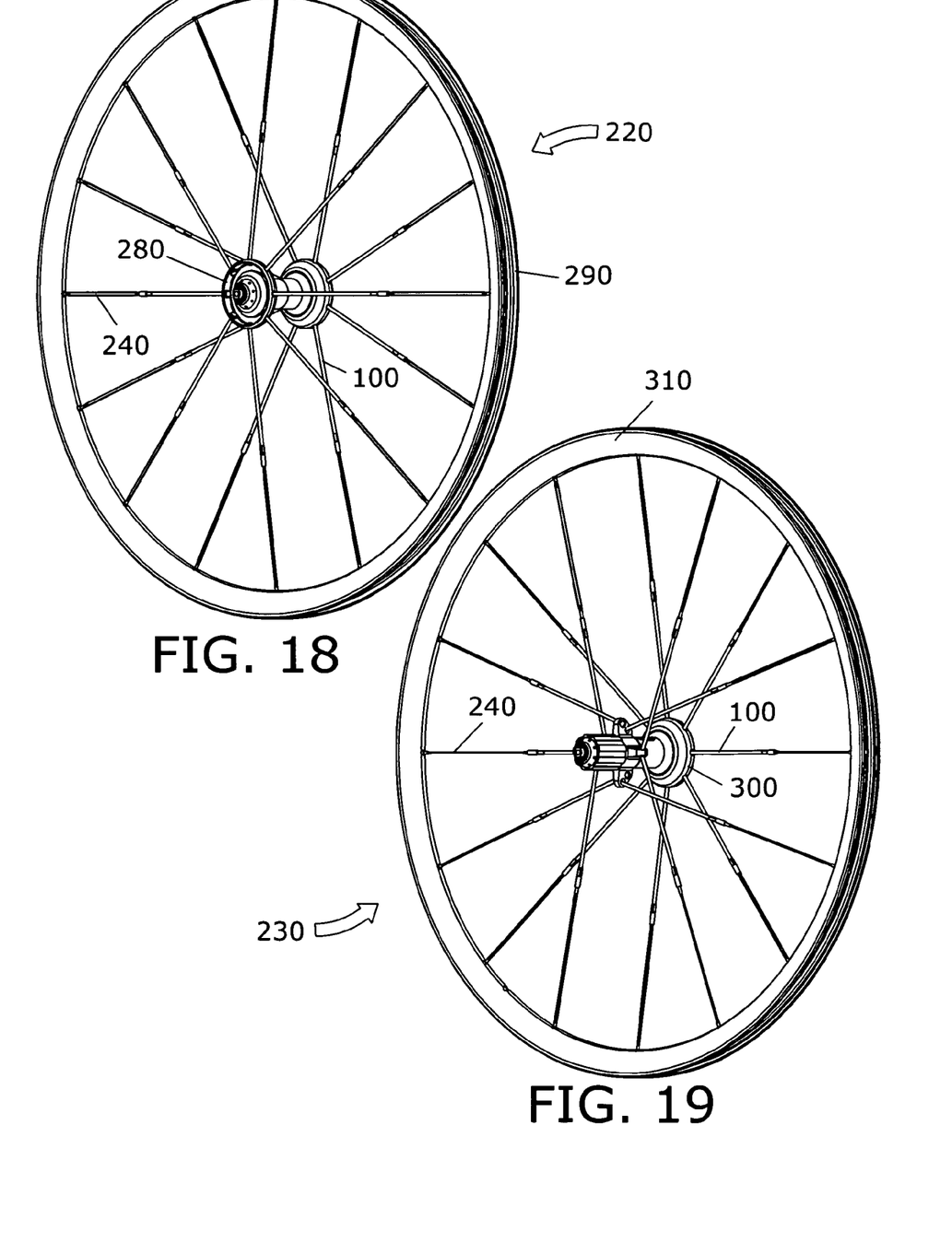
FIG. 18 is a perspective view of a third alternative embodiment of the inventive bicycle wheel.
FIG. 19 is a perspective view of a fourth alternative embodiment of the inventive bicycle wheel.

FIG. 18 shows an alternative embodiment wheel 220 comprised of a hub 280, nipples 100, spokes 240, and a rim 290. While wheel 220 does not have true paired spoking, many advantages remain compared to the prior art. Easy access spoke tension adjustment is still made via adjustment portions 102 about midway between hub 280 and rim 290. Rotational inertia is reduced by the weight of the spoke to nipple connection being moved away from rim 290 towards hub 180.

FIG. 19 shows an alternative embodiment wheel 230 comprised of a hub 300, nipples 100, spokes 240, and a rim 310. Wheel 230 is a rear wheel and has crossed spokes on the drive side of the wheel for transmitting power from the rider to the tire. While wheel 230 does not have true paired spoking, many advantages remain compared to the prior art. Easy access spoke tension adjustment is still made via adjustment portions 102 about midway between hub 300 and rim 310. Rotational inertia is reduced by the weight of the spoke to nipple connection being moved away from rim 310 towards hub 300.

Other Embodiments

Those skilled in the art having the benefit of the disclosed embodiments will readily perceive other embodiments. For example, an alternative embodiment has inner and outer spokes, yet uses the same novel rim. The outer spokes are made from a length of wire with a thread at each end and then bent in the middle into a wishbone or V shape. A nipple is slipped onto each end of the wishbone or V spoke, and then ends of the spoke are headed so that the nipples cannot come off. The inner spokes have a head at one end and a thread at the other end. For a 24 nipple wheel, there are 36 spokes, 24 nipples, and 12 rim spoke holes. Each outer (wishbone or V) spoke passes through a spoke hole until the mid-point of the spoke is in the spoke hole as in the preferred embodiment. Each inner spoke passes through a hole in the hub or is otherwise secured to the hub. As with the preferred embodiment, there is trued paired spoking in that there are only half the points of spoke attachment to the rim as compared to prior art wheels. In another alternative embodiment, the nipples could be attached to the inner spokes instead of the outer wishbone or V spokes.

In yet another embodiment, the hub and long nipples are used with a standard rim. There are still advantages of this compared to prior art wheels in that the spoke tension adjustment is easier because of the access to the nipples with a tool. For this embodiment, the number of nipples equals the number of spokes. It is preferable if the spokes have at least a small portion that is "bladed". During spoke tension adjustment, the spokes can be prevented from turning by holding the bladed portion of the spokes.

In still another embodiment that uses a standard rim, there are inner and outer spokes, and nipples are mounted on the ends of either the inner or outer spokes.

While the wheels disclosed have a particular number of spokes and nipples, other quantities could also be used. Therefore, the scope hereof is not to be limited by the disclosed embodiments, but only by the appended claims and their equivalents.

We claim:

1. A bicycle wheel comprising:
   a rim;
   a hub separated from the rim by a distance;
   a plurality of spokes extending from the rim toward the hub, wherein each spoke has a threaded portion; and
   a plurality of nipples extending directly from the hub toward the rim, and having a length of more than 20% and less than 80% of the distance between the hub and the rim, wherein each nipple has a threaded opening to engage the threaded portion of the spoke.

2. The bicycle wheel recited in claim 1, wherein the nipples each comprise a tension adjustment.

3. The bicycle wheel recited in claim 1, wherein the nipples extend more than 40% and less than 60% of the distance from said hub to said rim.

4. A bicycle wheel comprising:
   a rim;
   a hub;
   a plurality of spokes each being in a V shape having a pair of elongated legs extending from a common apex at a non-zero angle, each of said legs terminating with a threaded end portion; and
   a plurality or nipples coupled to and directly extending from the hub, and having a length of more than 20% and less than 80% of the distance between the hub and the rim, each nipple comprising a threaded cavity to engage the threaded end portion of the legs.

5. The bicycle wheel recited in claim 4 wherein each of said spokes is connected to said rim at a rim hole through which said apex extends.

6. The bicycle wheel recited in claim 5 wherein each said rim hole has an axis and said hub has an axis and wherein each said rim hole axis is parallel to said hub axis.

7. The bicycle wheel recited in claim 4 wherein each of said spokes is connected to said hub by a pair of said nipples on opposed axial ends of said hub;
   said spokes and said nipples being connected in a state of selected tension, the tension being selected so that the net force from all of said spokes and nipples lies in the plane of rotation of said wheel.

8. A spoked wheel comprising a rim and a hub interconnected by a plurality of spokes and nipples; each said spoke having a V-shape formed by a pair of spoke legs extending from a common apex, each spoke leg comprising a threaded end portion, the apex connected to the rim at a hole having an axis extending parallel to the axis of said hub, said hub having two opposed sets of flanges extending radially, each said flange having a pair of nipple attachments from which a corresponding pair of said nipples extend directly from the hub toward said rim, and having a length of more than 20% and less than 80% of the distance between the hub and the rim, each nipple comprising a threaded opening to connect to said threaded end portion of said spoke legs.

9. The spoked wheel recited in claim 8 wherein each said pair of nipple attachments on each of said hub flanges is located along a line that is diagonal relative to said hub axis.

10. The spoked wheel recited in claim 9 wherein said nipple attachments comprise holes.

11. A spoked wheel comprising:
    a circumferential rim holding an air-filled tire and a centrally positioned hub for mating the wheel for rotational relation with an apparatus; said rim and said hub being interconnected by a plurality of spokes connected to said rim and a plurality of nipples connected to said hub, respective said spokes and nipples being connected in selection tension around the wheel;
    each said spoke having a V shape with single elongated member bent at its center to form an apex with two substantially equal length non-parallel legs extending from said apex, each of the legs ending in a threaded portion; said apex passing through a hole extending from said rim inboard of said tire, and each said leg being connected to a corresponding nipple so that there are two said nipples corresponding to each said rim hole, wherein each of said nipples comprises a threaded cavity to engage the threaded portion of the legs, wherein each of said nipples has a length of at least 20% and less than 80% of the distance from said hub to said rim.

12. The spoked wheel recited in claim 11 wherein each said rim hole has an axis which is parallel to the rotational axis of the wheel.

13. The spoked wheel recited in claim 11 wherein the shape of said spokes and the connection of said spokes to said rim, permits the net force of all of said spokes to reside in the plane of rotation of the wheel.

14. A spoked wheel comprising a rim and a hub interconnected by a plurality of connected spokes and nipples for adjustment of tension between said rim and said hub, the nipples extending directly from the hub, and having a length between 20% and 80% of the total distance between said hub and said rim, wherein each of the spokes comprises a threaded end portion and each of the nipples comprises a corresponding threaded opening to engage the threaded end portion of the spokes.

15. A spoked wheel comprising a rim and a hub interconnected by a plurality of connected spokes and nipples, said hub having two sets of flanges extending radially, each said flange having a pair of nipple attachments from which a corresponding pair of said nipples extend toward said rim, each pair of said nipples having a length between 20% and 80% of the total distance between said hub and said rim, each said pair of nipple attachments on each of said hub flanges being located along a line that is diagonal relative to the axis of said hub, wherein each of the spokes comprises a threaded end portion and each of the nipples comprises a corresponding threaded opening to engage the threaded end portion of the spokes.

* * * * *